United States Patent
Hung et al.

(10) Patent No.: US 11,343,065 B2
(45) Date of Patent: May 24, 2022

(54) SERIAL BIDIRECTIONAL COMMUNICATION CIRCUIT AND METHOD THEREOF

(71) Applicant: Nuvoton Technology Corporation, Hsinchu Science Park (TW)

(72) Inventors: Ming-Che Hung, Hsinchu County (TW); Chia-Ching Lu, Hsinchu (TW); Shih-Hsuan Hsu, Taoyuan (TW); Ping-Cheng Tsai, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 65 days.

(21) Appl. No.: 17/076,603

(22) Filed: Oct. 21, 2020

(65) Prior Publication Data

US 2021/0119762 A1    Apr. 22, 2021

(30) Foreign Application Priority Data

Oct. 22, 2019  (TW) .................... 108137976

(51) Int. Cl.
   *H04L 5/18*    (2006.01)
(52) U.S. Cl.
   CPC ...................... *H04L 5/18* (2013.01)
(58) Field of Classification Search
   CPC . H04L 5/18; H04L 5/0053; H04L 5/14; H04L 12/40006
   See application file for complete search history.

(56) References Cited

U.S. PATENT DOCUMENTS

| 2014/0328283 A1* | 11/2014 | Wan | H04W 28/18 |
| | | | 370/329 |
| 2017/0238293 A1* | 8/2017 | Lei | H04W 72/0406 |
| | | | 370/280 |
| 2021/0058221 A1* | 2/2021 | Taneja | H04L 5/14 |

FOREIGN PATENT DOCUMENTS

TW    I591370 B    7/2017

OTHER PUBLICATIONS

Office Action and Search Report corresponding Taiwanese Application No. 108137976 dated May 29, 2020 (pp. 4).

* cited by examiner

*Primary Examiner* — Shukri Taha
(74) *Attorney, Agent, or Firm* — Muncy, Geissler, Olds & Lowe, P.C.

(57) ABSTRACT

A serial bidirectional communication method is provided. The method includes: performing a downlink transmission and performing an uplink transmission. The downlink transmission includes: receiving first downlink data through a first transmission terminal, wherein the first downlink data comprises at least one control command, and the at least one control command is cascaded and configured to control at least one electronic device; removing one, corresponding to a local device, of the at least one control command from the first downlink data to form second downlink data, wherein the local device is one of the at least one electronic device; and when there is a control command remaining in the second downlink, outputting the second downlink data through a second transmission terminal. The uplink transmission includes outputting first uplink data through the first transmission terminal. The first uplink data includes local information generated by the local device.

13 Claims, 15 Drawing Sheets

SERIAL BIDIRECTIONAL COMMUNICATION CIRCUIT AND METHOD THEREOF

CROSS REFERENCE TO RELATED APPLICATIONS

This Application claims priority of Taiwan Patent Application No. 108137976, filed on Oct. 22, 2019, the entirety of which is incorporated by reference herein.

BACKGROUND OF THE INVENTION

Field of the Invention

This invention relates in general to bidirectional communication technology, and in particular it relates to a serial bidirectional communication circuit and a method thereof.

Description of the Related Art

Generally, in an application system, the main system device can perform bidirectional communication through connection lines connected between electronic devices and the main system device. However, as the number of electronic devices that need to communicate with the main system device increases, the number of pins used for bidirectional communication on the main system device must likewise increase accordingly. In addition, the configuration of the connection lines between the electronic devices and the main system device becomes more complicated.

BRIEF SUMMARY OF THE INVENTION

An embodiment of the present invention discloses a serial bidirectional communication method. The serial bidirectional communication method comprises the following steps: performing a downlink transmission and performing an uplink transmission. The downlink transmission comprises the following steps: receiving first downlink data through a first transmission terminal, wherein the first downlink data comprises at least one control command, and the at least one control command is cascaded and configured to control at least one electronic device; removing one, corresponds to a local device, of the at least one control command from the first downlink data to form second downlink data, wherein the local device is one of the at least one electronic device; and when there is a control command remaining in the second downlink data, outputting the second downlink data through a second transmission terminal. The uplink transmission comprises the following steps: outputting first uplink data through the first transmission terminal, wherein the first uplink data comprises local information generated by the local device.

An embodiment of the present invention discloses a serial bidirectional communication circuit. The serial bidirectional communication circuit comprises a first transmission terminal, a second transmission terminal, a transmission unit, and a control unit. The transmission unit is coupled between the first transmission terminal and the second transmission terminal. The control unit is configured to perform a downlink transmission and an uplink transmission. In the downlink transmission, the control unit receives first downlink data which comprises at least one control command through the first transmission terminal, removes one, corresponding to a local device, of the at least one control command by the transmission unit to form second downlink data, and outputs the second downlink data by the transmission unit through the second transmission terminal when there is a control command remaining in the second downlink data. The at least one control command is cascaded and configured to control at least one electronic device, and the local device is one of the at least one electronic device. In the uplink transmission, the control unit outputs first uplink data by through the first transmission terminal. The first uplink data comprises local information generated by the local device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In order to make the above-mentioned objects, features, and advantages of the embodiments of the present invention more obvious and understandable, a detailed description will be given below in conjunction with the accompanying drawings.

It must be understood that the terms "comprising" and "including" used in the specification are intended to indicate existence of specific technical features, values, method steps, operations, elements, and/or components, but not to excluded more technical features, values, method steps, operations, elements, components, or any combination of the above to be added.

The terms, such as "first", "second", and "third", are intended to modify elements for distinguishing elements with the same name, but not to indicate priority or antecedent relationship between them.

Figure 1:
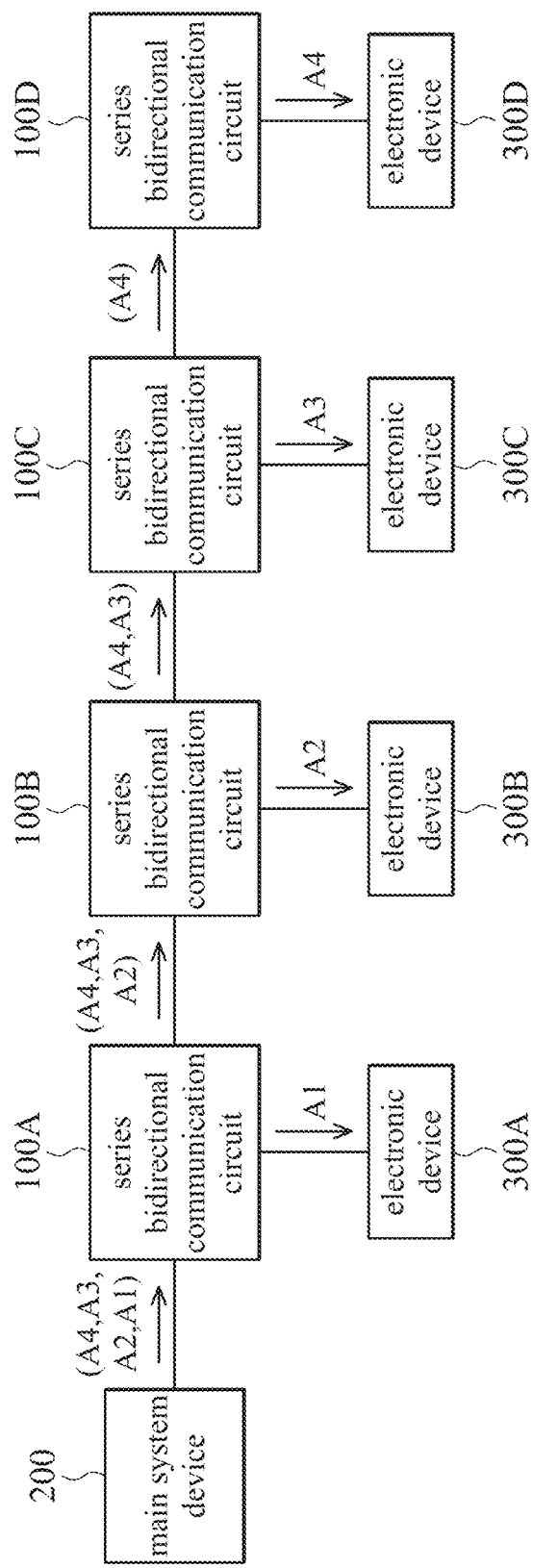
FIG. 1 is a schematic diagram showing an exemplary embodiment of a main system device performing a downlink transmission with electronic devices through serial bidirectional communication circuits.
Figure 2:
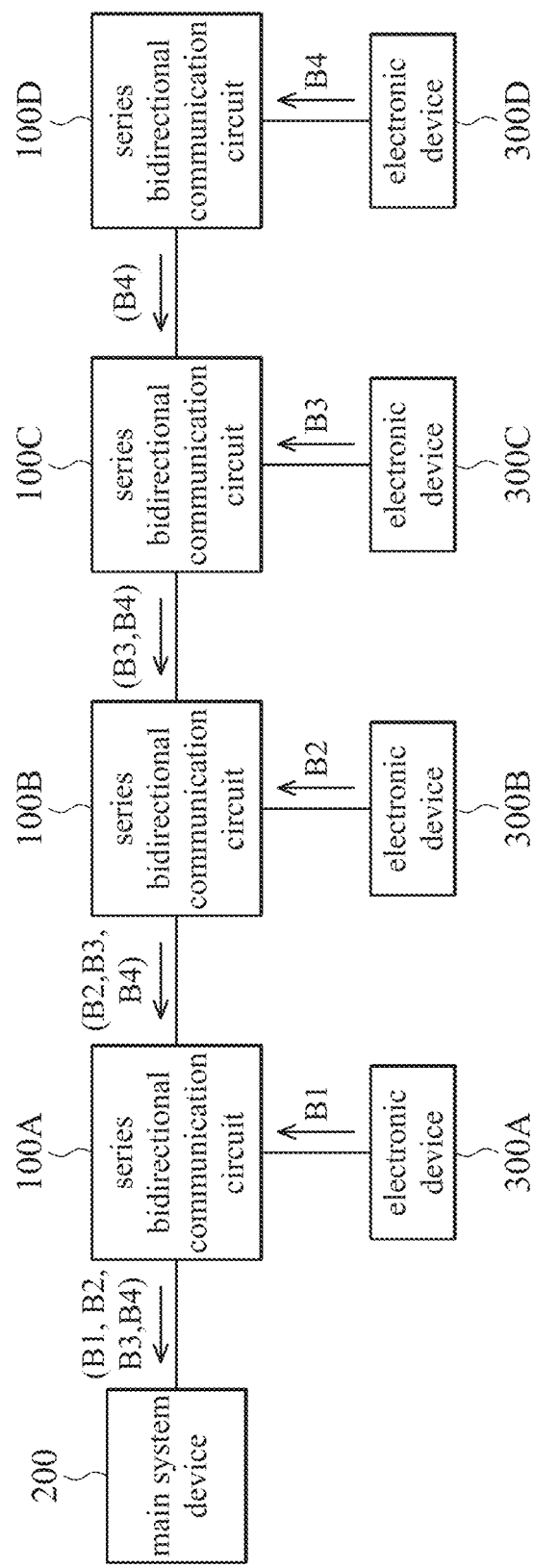
FIG. 2 is a schematic diagram showing an exemplary embodiment of a main system device performing an uplink transmission with electronic devices through serial bidirectional communication circuits.

FIG. 1 is a schematic diagram showing an exemplary embodiment of a main system device which performs a downlink transmission with electronic devices through serial bidirectional communication circuits, and FIG. 2 is a schematic diagram showing an exemplary embodiment of a main system device which performs an uplink transmission with electronic devices through serial bidirectional communication circuits. Please refer to FIGS. 1 and 2, serial bidirectional communication circuits in an application system is mainly used for communication between a main system device 200 and corresponding electronic devices and can be used to transfer the communication between the main system device 200 and other electronic devices.

In an embodiment, the application system may comprise the main system device 200, at least one serial bidirectional communication circuit, and at least one electronic device. Each serial bidirectional communication circuit is coupled between the main system device 200 and a corresponding electronic device to serve as a communication bridge between the main system device 200 and the corresponding electronic device. In addition, all the serial bidirectional communication circuits can be successively connected in series and further connected to the main system device 200 in series, so that the main system device 200 can perform bidirectional communication with the respective electronic devices through all the serial bidirectional communication circuits which are connected to the main system device 200 in series.

In the following paragraphs, the application system which comprises four series bidirectional communication circuits 100A~100D and four electronic devices 300A~300D is taken as an example for description. It should be noted that the aforementioned number of series bidirectional communication circuits and the aforementioned number of electronic devices quantity is not intended to limit the present invention and can be adjusted according to the actual application system.

The serial bidirectional communication circuits 100A~100D correspond to the electronic devices 300A~300D respectively in sequence. In the embodiment, the serial bidirectional communication circuit 100A is electrically connected to the electronic device 300A and the main system device 200. The series bidirectional communication circuit 100B is electrically connected to the electronic device 300B and the series bidirectional communication circuit 100A. The series bidirectional communication circuit 100C is electrically connected to the electronic device 300C and the series bidirectional communication circuit 100B. In addition, the series bidirectional communication circuit 100D is electrically connected to the electronic device 300D and the series bidirectional communication circuit 100C.

As shown in FIG. 1, in an embodiment of a downlink transmission of the application system, the main system device 200 may transmit downlink data to the serial bidirectional communication circuit 100A in a serial transmission manner. The downlink data may comprise at least one control commands A1~A4 for controlling the electronic devices 300A~300D, Each of the control commands A1~A4 may correspond to one of the electronic devices 300A~300D. In the following description, the main system device 200 which outputs four control commands A1~A4 respectively corresponding to the four electronic devices 300A~300D is taken as an example for description, however, the present invention is not limited thereto. In another embodiment where there are four electronic devices 300A~300D, the main system device 200 may output only two control commands A1~A2 respectively corresponding to the electronic devices 300A~300B.

In some embodiments, the control commands A1~A4 in the downlink data can be cascaded (or linked in sequence or series) according to a transmission sequence. For example, the main system device 200 may successively output the control command A1 corresponding to the electronic device 300A, the control command A2 corresponding to the electronic device 300B, the control command A3 corresponding to the electronic device 300C, and the control command A4 corresponding to the electronic device 300D. Accordingly, each of the series bidirectional communication circuits 100A~100D can learn about which control command corresponds to a local device according to the arrival sequence of the control commands in the downlink data. For example, the serial bidirectional communication circuit 100A may regard the control command, which is received first among the control commands in the downlink data, as a control command A1 corresponding to the local device (for the serial bidirectional communication circuit 100A, the electronic device 300A is the local device), however, the present invention is not limited thereto.

In other implementations, if each serial bidirectional communication circuit 100A~100D can identify which control command corresponds to the local device (for example, according to the identification code of each control command, etc.), the main system The device 200 can also output the control commands A1~A4 belonging to the electronic devices 300A~300D in random order.

When the serial bidirectional communication circuit 100A receives downlink data, the serial bidirectional communication circuit 100A removes the control command A1 corresponding to a local device (for the serial bidirectional communication circuit 100A, the electronic device 300A is the local device) from the downlink data to the electronic device 300A and then transmits the downlink data comprising the remaining control commands A2~A4 to the subsequent serial bidirectional communication circuit 100B.

Similarly, when the series bidirectional communication circuit 100B receives the downlink data transmitted by the series bidirectional communication circuit 100A, the series bidirectional communication circuit 100B removes the control command A2 corresponding to a local device (for the series bidirectional communication circuit 100B, the electronic device 300B is the local device) the downlink data to the electronic device 300B and then transmits the downlink data comprising the remaining control commands A3~A4 to the subsequent serial bidirectional communication circuit 100C. Similarly, based on the above manner, the downlink data comprising the control command A4 is transmitted to the series bidirectional communication circuit 100D.

When the series bidirectional communication circuit 100D receives the downlink data transmitted by the series bidirectional communication circuit 100O, the series bidirectional communication circuit 100D removes the control command A4 corresponding to a local device (for the series bidirectional communication circuit 100D, the electronic device 300D is the local device) from the downlink data. In this case, since the downlink data does not comprise any control commands (that is, there is no downlink data) after the control command A4 corresponding to the electronic device 300D is removed, the serial bidirectional communication circuit 100D may not transmit the downlink data.

In the following, four pieces of report information are taken as an example for description of an uplink transmission. For clarity, these four pieces of report information are referred to as report formation B1, report formation B2, report formation B3, and report formation B4 thereinafter. As shown in FIG. 2, in an embodiment of an uplink transmission of the application system, the serial bidirectional communication circuit 100D receives the report information B4 which is reported by the electronic device 300D to the main system device 200 (for the serial bidirectional communication circuit 100D, the report information B4 can be referred to as local report information B4). In addition, the serial bidirectional communication circuit 100D directly uses the received local report information B4 as uplink data and transmits the uplink data to the serial bidirectional communication circuit 100C. The serial bidirectional communication circuit 100C receives the report information B3 which is reported by the electronic device 300C to the main system device 200 (for the serial bidirectional communication circuit 100C, the report information B3 can be referred to as local report information B3).

When receiving the uplink data transmitted by the serial bidirectional communication circuit 100D, the serial bidirectional communication circuit 100C first adds the local report information B3 output by the electronic device 300C into the received uplink data and then transmits the uplink data to the serial bidirectional communication circuit 100B. The serial bidirectional communication circuit 100B receives the report information B2 which is reported by the electronic device 300B to the main system device 200 (for the serial bidirectional communication circuit 100B, the report information B2 can be called the local report information B2). Moreover, when receiving the uplink data transmitted by the serial bidirectional communication circuit 100C, the serial bidirectional communication circuit 100B first adds the local report information B2 output by the electronic device 300B into the received uplink data and then transmits the uplink data to the serial bidirectional communication circuit 100A.

Similarly, the serial bidirectional communication circuit 100A can receive the report information B1 which is reported by the electronic device 300A to the main system device 200 (for the serial bidirectional communication circuit 100A, the report information B1 be referred to as local report information B1). Moreover, when receiving the uplink data transmitted by the serial bidirectional communication circuit 100B, the serial bidirectional communication circuit 100A first adds the local report information B1 output by the electronic device 300A into the received uplink data and then transmits the uplink data to the main system device 200.

In some implementations, each of the serial bidirectional communication circuits 100A~100C can cascade the local report information which is output by the corresponding local device to the front of all the report information in the received uplink data. For example, the serial bidirectional communication circuit 100C cascades the local report information B3 which is output by the electronic device 300C to the front of the report information B4 in the uplink data which is output by the electronic device 300D.

In this way, the main system device 200 can learn about the status of each electronic device 300A~300D according to the arrival sequence of respective report information in the received uplink data. For example, the main system device 200 learns about the status of the electronic device 300A according to the report information which is first received in the uplink data, however, the present invention is not limited thereto. In other implementations, if the main system device 200 can identify which report information in the uplink data corresponds to which electronic device (for example, according to an identification code of each record of the report information), each of the serial bidirectional communication circuit 100A~100C can cascade the local report information output by the corresponding local devices to the uplink data received in an arbitrary order.

Figure 3:
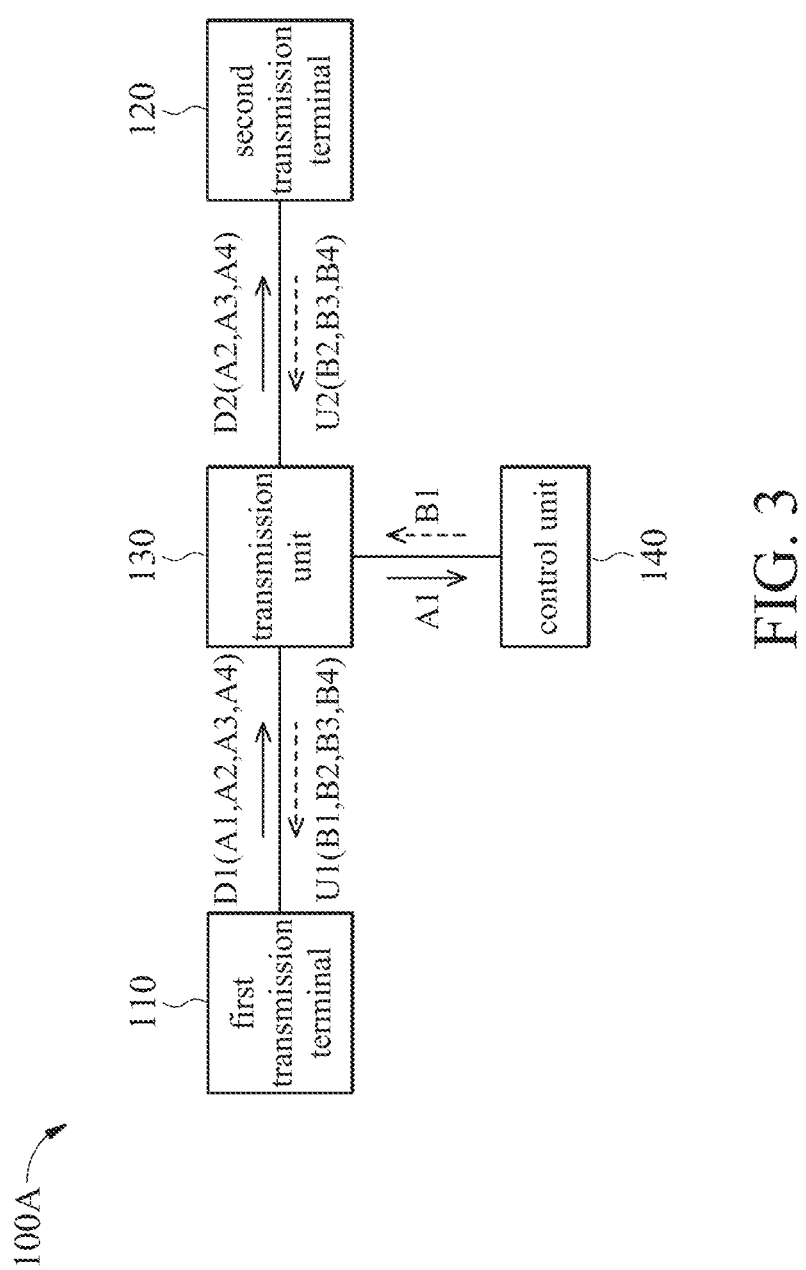
FIG. 3 is a block diagram showing an exemplary embodiment of a serial bidirectional communication circuit.

FIG. 3 is a block diagram showing an exemplary embodiment of a serial bidirectional communication circuit. Please refer to FIG. 1~FIG. 3, in the following paragraphs, the series bidirectional communication circuit 100A is taken as an example for illustrating the circuit structure. The circuit structures of the remaining series bidirectional communication circuits 100B~100D are substantially the same as that of the series bidirectional communication circuit 100A, and, thus, the circuit structure of the series bidirectional communication circuit 100A can be referred to for the circuit structures of the series bidirectional communication circuits 100B~100D.

In an embodiment, the serial bidirectional communication circuit 100A may comprise a first transmission terminal 110, a second transmission terminal 120, a transmission unit 130, and a control unit 140. The transmission unit 130 is coupled between the first transmission terminal 110 and the second transmission terminal 120. Furthermore, the control unit 140 is coupled to the transmission unit 130.

The first transmission terminal 110 is configured to connect the main system device 200 or the second transmission terminal 120 of another serial bidirectional communication circuit. In the embodiment, the first transmission terminal 110 of the serial bidirectional communication circuit 100A is connected to the main system device 200. The first transmission terminal 110 of another series bidirectional communication circuit, for example, the series bidirectional communication circuit 100B, is connected to the second transmission terminal 120 of the series bidirectional communication circuit 100A. The first transmission terminal 110 of the series bidirectional communication circuit 100C is connected to the second transmission terminal 120 of the series bidirectional communication circuit 100B. Moreover, the first transmission terminal 110 of the series bidirectional communication circuit 100D is connected to the second transmission terminal 120 of the series bidirectional communication circuit 100C.

The second transmission terminal 120 is configured to connect to the first transmission terminal 110 of another serial bidirectional communication circuit. As shown in FIG. 1 or FIG. 2, when a series bidirectional communication circuit is the last one among the series bidirectional communication circuits which are successively connected in series, such as the series bidirectional communication circuit 100D, the second transmission terminal 120 is not connected to the first transmission terminal 110 of any bidirectional communication circuit.

The transmission unit 130 is configured to receive and/or forward the downlink data sent by the main system device 200 and further to receive and return the uplink data comprising the report information of the electronic devices. The control unit 140 can execute the serial bidirectional communication method according to any embodiment of the present invention.

Figures 4A, 4B:
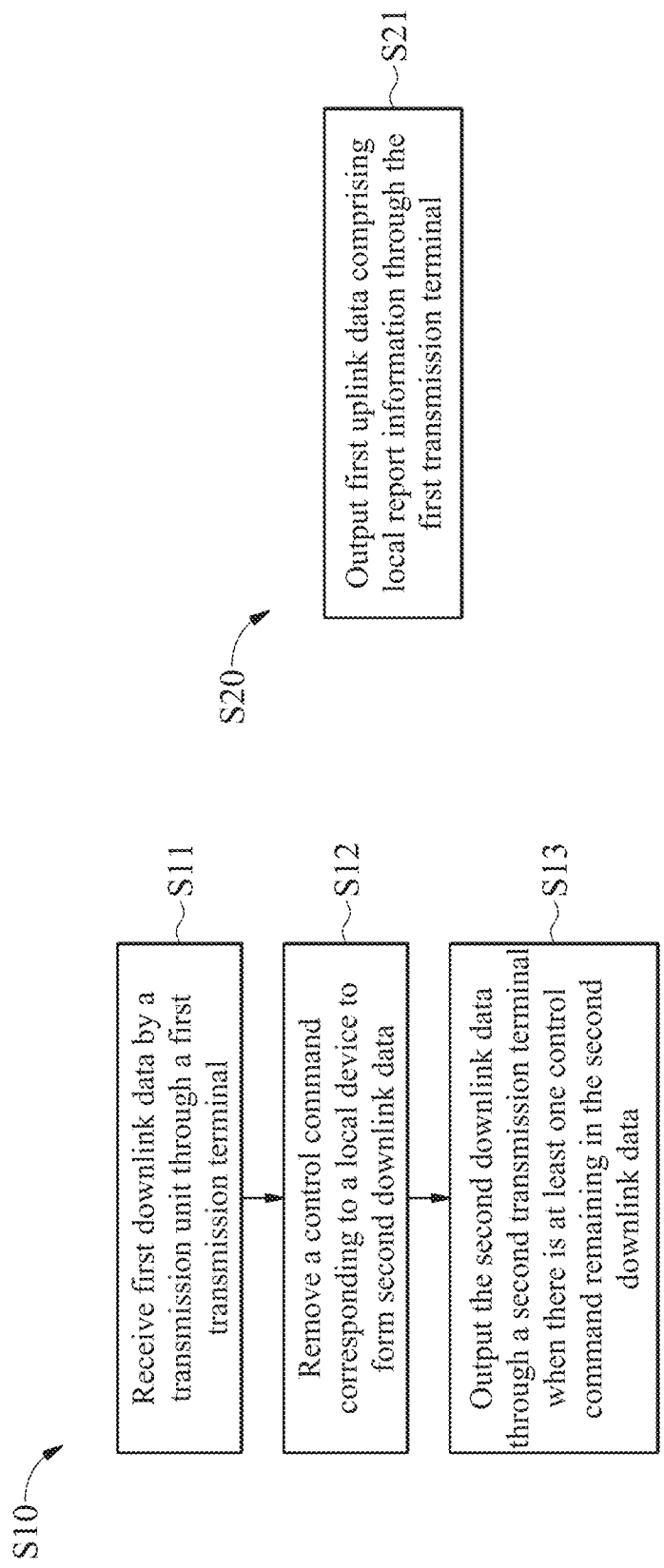
FIG. 4A is a flow chart of a downlink transmission in an exemplary embodiment of a serial bidirectional communication method.
FIG. 4B is a flow chart of an uplink transmission in an exemplary embodiment of a the serial bidirectional communication method.

FIG. 4A is a flow chart of a downlink transmission in an exemplary embodiment of a serial bidirectional communication method, and FIG. 4B is a flow chart of an uplink transmission in an exemplary embodiment of a serial bidirectional communication method. Referring to FIGS. 1~4B, in an embodiment of the serial bidirectional communication method, the control unit 140 may a perform downlink transmission (Step S10) and an uplink transmission (Step S20).

In the downlink transmission, the control unit 140 receives first downlink data D1 by the transmission unit 130 through the first transmission terminal 110 (Step S11). The first downlink data D1 may comprise at least one cascaded control command. In the following, the main system device 200 which outputs the first downlink data D1 comprises four control commands A1~A4 is taken as an example. Thus, the control unit 140 of the serial bidirectional communication circuit 100A receives the first downlink data comprising the four control commands A1~A4 through the first transmission terminal 110

After the transmission unit 130 receives the first downlink data D1, the control unit 140 removes the control command A1 corresponding to the local device (that is, the electronic device 300A) from the first downlink data D1 through the transmission unit 130 to form second downlink data D2 (Step S12). After the control unit 140 of the serial bidirectional communication circuit 100A removes the control command A1 corresponding to the local device, the second downlink data D2 comprises only three control commands A2~A4 which are cascaded for controlling the electronic devices 300B~300C.

Then, when there is at least one control command remaining in the second downlink data D2 control unit 140 outputs the second downlink data D2 by the transmission unit 130 through the second transmission terminal 120 (Step S13). The second downlink data D2 is output for the serial bidirectional communication circuit 100B.

In the uplink transmission, the control unit 140 may receive local report information B1 which is reported by the local device (that is, the electronic device 300A) to the main system device 200. The control unit 140 generates first uplink data U1 according to the local report information B1 and output the first uplink data U1 by the transmission unit 130 through the first transmission terminal 110 (Step S21). The first uplink data U1 is output for the main system device 200.

Figure 5:
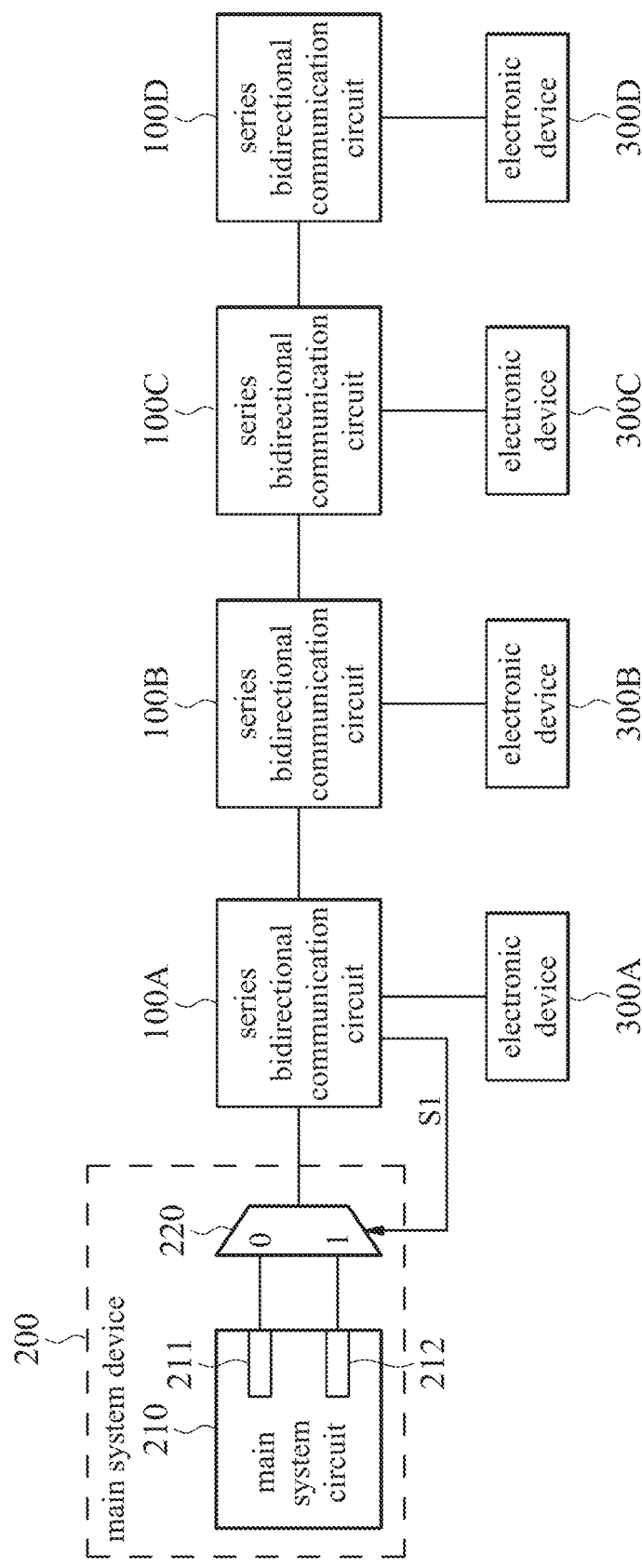
FIG. 5 is a schematic diagram showing a first embodiment of an application system.
Figure 6:
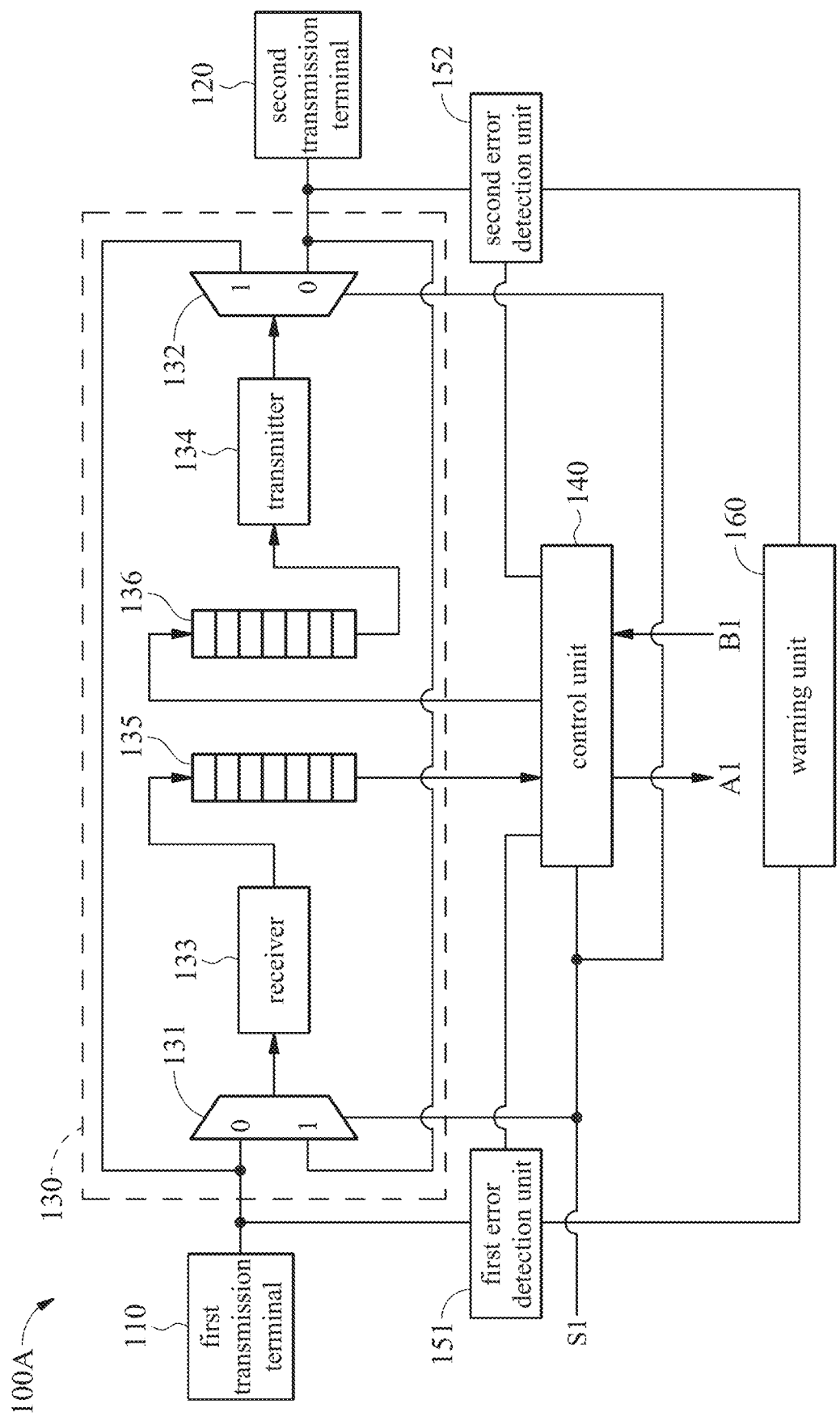
FIG. 6 is a schematic diagram showing an exemplary embodiment of a series bidirectional communication circuit in FIG. 5.

FIG. 5 is a schematic diagram showing a first embodiment of an application system, and FIG. 6 is a schematic diagram showing an exemplary embodiment of the series bidirectional communication circuit in FIG. 5. Please refer to FIG. 5~6, in the first embodiment of the application system, the serial bidirectional communication circuits 100A~100D are serially connected to the main system device 200 through a single connection line, and the main system device 200 and serial bidirectional communication circuits 100A~100D may communicate with the electronic devices 300A~300D through the single connection line. In this way, the main system device 200 may not need to use many pins for the bidirectional communication. Thus, the configuration or layout of the connection lines in the application system is simplified, and the total number of electronic devices in the application system is not limited by the number of control pins of the main system device.

In the first embodiment of the application system, since the uplink transmission and the downlink transmission share a single connection line, a time-division manner is required for the bidirectional communication, which can be referred to as a half-duplex communication system. In the embodiment, the transmission unit 130 of each of the series bidirectional communication circuit 100A~100D may comprise at least two selectors (hereinafter referred to as a first selector 131 and a second selector 132), a receiver 133, a transmitter 134, and at least two queues (hereinafter referred to as a first queue 135 and a second queue 136).

The first selector 131 comprises a first connection terminal, a second connection terminal, and a third connection terminal. The first connection terminal of the first selector 131 is coupled to the first transmission terminal 110, the second connection terminal of the first selector 131 is coupled to the second transmission terminal 120, and the third connection terminal of the first selector 131 is coupled to an input terminal of the receiver 133. An output terminal of the receiver 133 is coupled to an input terminal of the first queue 135, and an output terminal of the first queue 135 is coupled to the control unit 140.

The second selector 132 comprises a fourth connection terminal, a fifth connection terminal, and a sixth connection terminal. The fourth connection terminal of the second selector 132 is coupled to the second transmission terminal 120, the fifth connection terminal of the second selector 132 is coupled to the first transmission terminal 110, and the sixth connection terminal of the second selector 132 is coupled to an output terminal of the transmitter 134. An input terminal of the transmitter 134 is coupled to an output terminal of the second queue 136, and an input terminal of the second queue 136 is coupled to the control unit 140.

The first selector 131 is controlled by the control unit 140, and the first selector 131 can selectively establish a first connection path between the first connection terminal and the third connection terminal or a second connection path between the second connection terminal and the third connection terminal according to a logic value of a selection signal S1 output by the control unit 140. The second selector 132 is also controlled by the control unit 140, and the second selector 132 can selectively establish a third connection path between the fourth connection terminal and the sixth connection terminal or a fourth connection path between the fifth connection terminal and the sixth connection terminal according to the logic value of the selection signal S1 output by the control unit 140.

When the control unit 140 intends to perform a downlink transmission, the control unit 140 will output the selection signal S1 whose logic value is equal to a first value. At this time, the first selector 131 establishes the first connection path between the first connection terminal and the third connection terminal, and the second selector 132 establishes the third connection path between the fourth connection terminal and the sixth connection terminal. Accordingly, so that the first transmission terminal 110 can be electrically connected to the input terminal of the receiver 133 through the first selector 131, and the second transmission terminal 120 can be electrically connected to the output terminal of the transmitter 134 through the second selector 132.

When the control unit 140 intends to perform an uplink transmission, the control unit 140 outputs the selection signal S1 whose logic value is equal to a second value. At this time, the first selector 131 establishes the second connection path between the second connection terminal and the third connection terminal, and the second selector 132 establishes the fourth connection path between the fifth connection terminal and the sixth connection terminal. Accordingly, the second transmission terminal 120 can be electrically connected to the input terminal of the receiver 133 through the first selector 131, and the first transmission terminal 110 can be electrically connected to the output terminal of the transmitter 134 through the second selector 132.

In some aspects of the embodiment, the receiver 133 may be a receiver with a universal asynchronous receiver/transmitter (UART) transmission interface or a suitable receiver for serial transmission interfaces. The transmitter 134 may be a transmitter with a universal asynchronous receiver/transmitter (UART) transmission interface or suitable transmitter for serial transmission interfaces. The first selector 131 and the second selector 132 can be implemented by multiplexers (MUXs) or other suitable path switching/selection logics. In addition, the first value may be "0", and the second value may be "1", but the present invention is not limited thereto. In other aspects of the embodiment, the first value may be "1", and the second value may be "0".

Figure 7A:
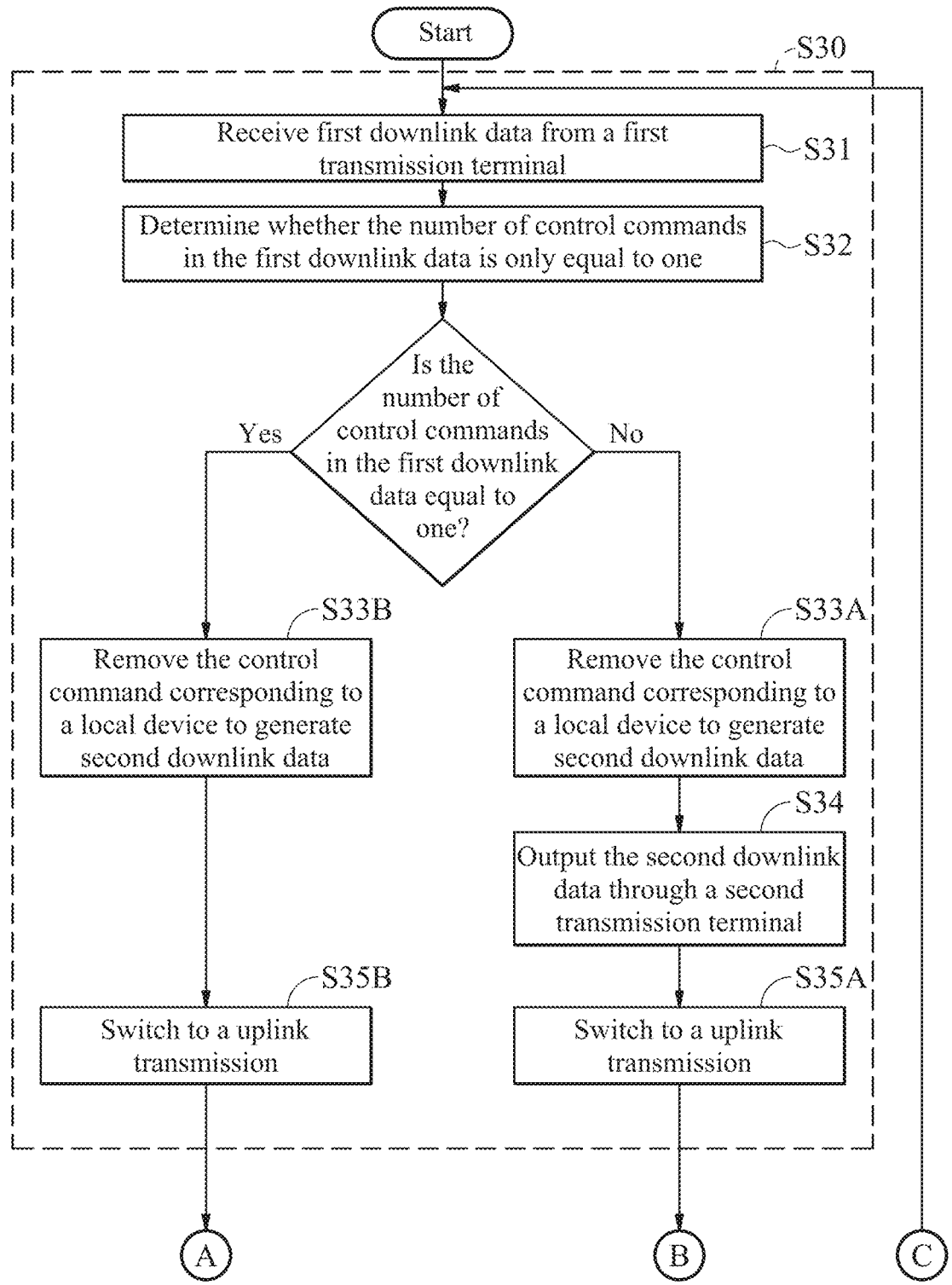
FIGS. 7A and 7B are a flow chart of one exemplary embodiment of a serial bidirectional communication method for a serial bidirectional communication circuit in FIG. 6.
Figure 7B:
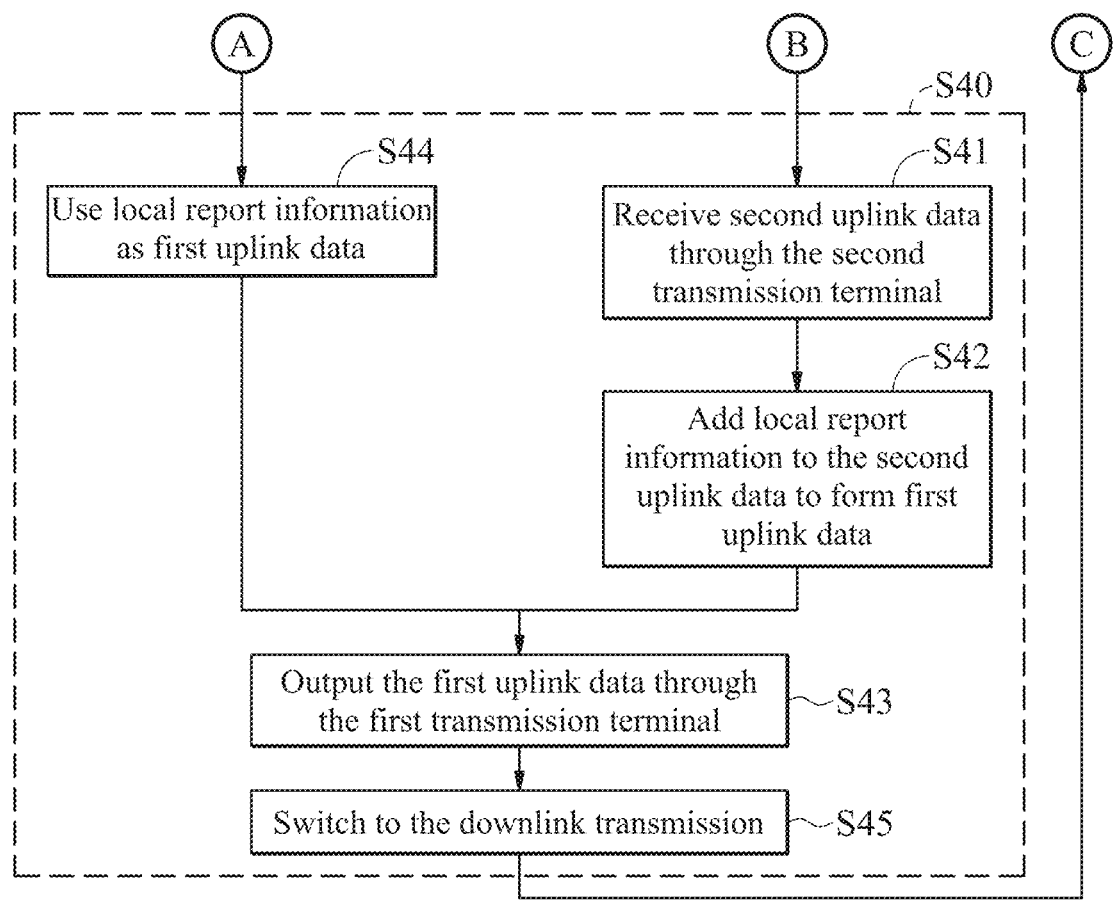

FIGS. 7A and 7B are a flow chart of one exemplary embodiment of a serial bidirectional communication method for the serial bidirectional communication circuit in FIG. 6. Referring to FIGS. 5~7B, in an embodiment of the serial bidirectional communication method, the control unit 140 may perform a downlink transmission first (Step S30) and output the selection signal S1 whose logic value is equal to the first value. In the downlink transmission, the receiver 133 receives the first downlink data D1 from the first transmission terminal 110 through the first connection path and write the first downlink data D1 to the first queue 135 (Step S31). Then, the control unit 140 may obtain the first downlink data D1 by reading the first queue 135. In addition, the control unit 140 determines whether the number of control commands in the first downlink data D1 is only equal to one (Step S32).

The case where the control unit 140, in Step S32, determines that the number of control commands in the first downlink data D1 is not only equal to one indicates that there is at least one control command remaining in the first downlink data D1 after the control command corresponding to the local device is removed. Therefore, the control unit 140 removes the control command corresponding to the local device from the obtained first downlink data D1 to generate the second downlink data D2 (Step S33A). Then, the control unit 140 writes the second downlink data D2 into the second queue 136. The transmitter 134 obtains the second downlink data D2 from the second queue 136 and transmits the second downlink data D2 to the second transmission terminal 120 through the second selector 132 via the third connection path (Step S34).

In some embodiments, each of the first queue 135 and the second queue 136 may be a first-in-first-out (FIFO) queue. For example, in a case where the input first downlink data D1 comprises the control command A1, the control command A2, the control command A3, and the control command A4 which are cascaded, the receiver 133 receives and writes the control command A1, the control command A2, the control command A3, and the control command A4 into the first queue 135 successively, and the control unit 140 reads the control command A1, the control command A2, the control command A3, and the control command A4 from the first queue 135 successively.

After the control unit 140 removes the control command A1 corresponding to the local device, since the generated second downlink data D2 still comprises the control command A2, the control command A3, and the control command A4, the control unit 140 writes the control command A2 the control command 43, and the control command A4 in to the second queue 136 successively. Then, the transmitter 134 obtains the control command A2, the control command A3, and the control command A4 from the second queue 136 successively and transmit the control command A2, the control command A3, and the control command A4 to the second transmission terminal 120 successively.

After the control unit 140 has output the second downlink data D2 by the transmission unit 130 through the second transmission terminal 120 (that is, after step S34), the control unit 140 outputs the selection signal S1 whose logic value is equal to the second value, thereby switching to the uplink transmission (Step S35A). Since the control unit 140 switches to the uplink transmission after it has output the second downlink data D2 through the second transmission terminal 120, the control unit 140 learns about that the corresponding serial bidirectional communication circuit which it belongs to is not the last one in the downlink transmission. Therefore, after switching to the uplink transmission (Step S40), the control unit 140 needs to first receive the second uplink data U2, which is transmitted by the subsequent serial bidirectional communication circuit, from the second transmission terminal 120 through the first selector 131 via the second connection path the first selector 131 (Step S41).

For example, when there is the second uplink data U2, which comprises the cascaded pieces of report information B2~B4 (or which comprises the pieces of report information B2~B4 linked in sequence), at the second transmission terminal 120, the receiver 133 may write the report information B2, the report information B3, and the report information B4 which are contained in the second uplink data U2 into the first queue 135 successively, and the control unit 140 may obtain the report information B2, the report information 133, and the report information B4 successively by reading the first queue 135.

Then, the control unit 140 cascades the local report information B1 reported by the local device to the front of the report information B2, the report information B3, and the report information B4 to form the first uplink data U1 (Step S42) and write the first uplink data U1 into the second queue 136 (that is, the local report information B1, the report information B2, the report information B3, and the report information B4 are written sequentially).

Then, the control unit 140 obtains the first uplink data U1 successively from the second queue 136 by the transmitter 134 (that is, the control unit 140 obtains the local report information B1, the report information B2, the report information B3, and the report information B4 successively) and further transmits the first uplink data U1 to the first transmitting terminal 110 through the second selector 132 via the fourth link path (that is, the control unit 140 transmits the local report information B1, the report information B2, the report information B3, and the report information B4 successively) (Step S43).

However, the case where the control unit 140, in Step S32, determines that the number of control commands in the first downlink data D1 is only equal to one (for example, the first downlink data D1 output by the main system device 200 only comprises the control command A1) indicates that there is no control commands remaining in the second downlink data D2 which is obtained after the control command corresponding to the local device is removed. Therefore, after the control unit 140 removes the control command corresponding to the local device from the obtained first downlink data D1 to generate the second downlink data D2 (Step S33B), the control unit 140 outputs the selection signal S1 whose logic value is equal to the second value, thereby switching to the uplink transmission (Step S35B).

Since the control unit 140 switches to the uplink transmission because it does not need to output the second downlink data D2, the control unit 140 learns about that the corresponding serial bidirectional communication circuit which it belongs to is the last one in the downlink transmission. Therefore, after switching to the uplink transmission (Step S40), the control unit 140 directly uses the local report information B1 as the first uplink data U1 and write the first uplink data U1 into the second queue 136 (Step S44). In addition, the control unit 140 obtains the first uplink data U1 from the second queue 136 by the transmitter 134 and transmits the first uplink data U1 to the first transmission terminal 110 through the second selector 132 (Step S43) for actively initiate uplink transmission.

In the uplink transmission, after the control unit 140 has output the first uplink data U1 through the first transmission terminal 110 (that is, after the execution of Step S43), the control unit 140 may switch to the downlink transmission (Step S45), and the method returns to Step S30.

Figure 8A:
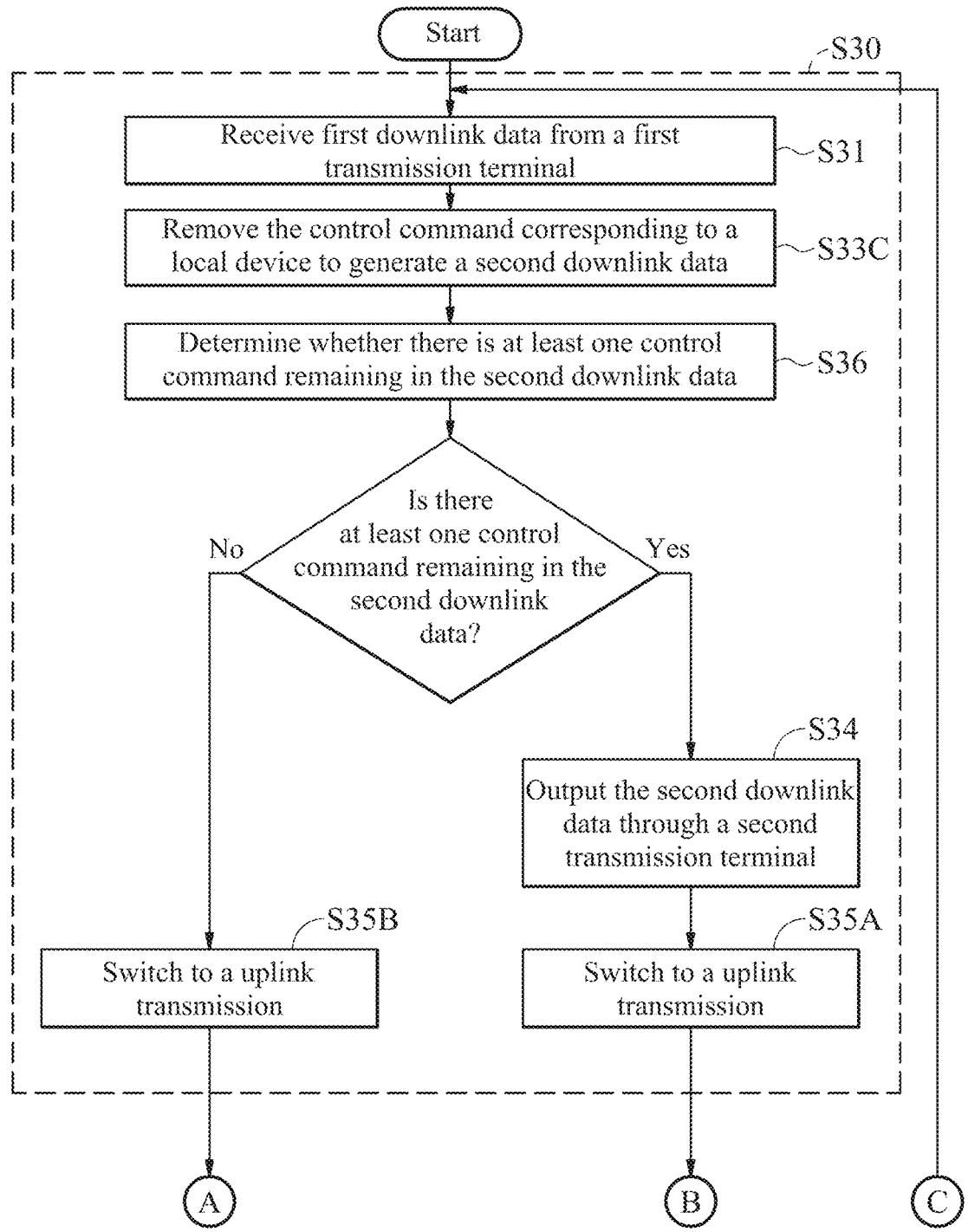
FIGS. 8A and 8B is a flow chart of another exemplary embodiment of a serial bidirectional communication method for a serial bidirectional communication circuit in FIG. 6.
Figure 8B:
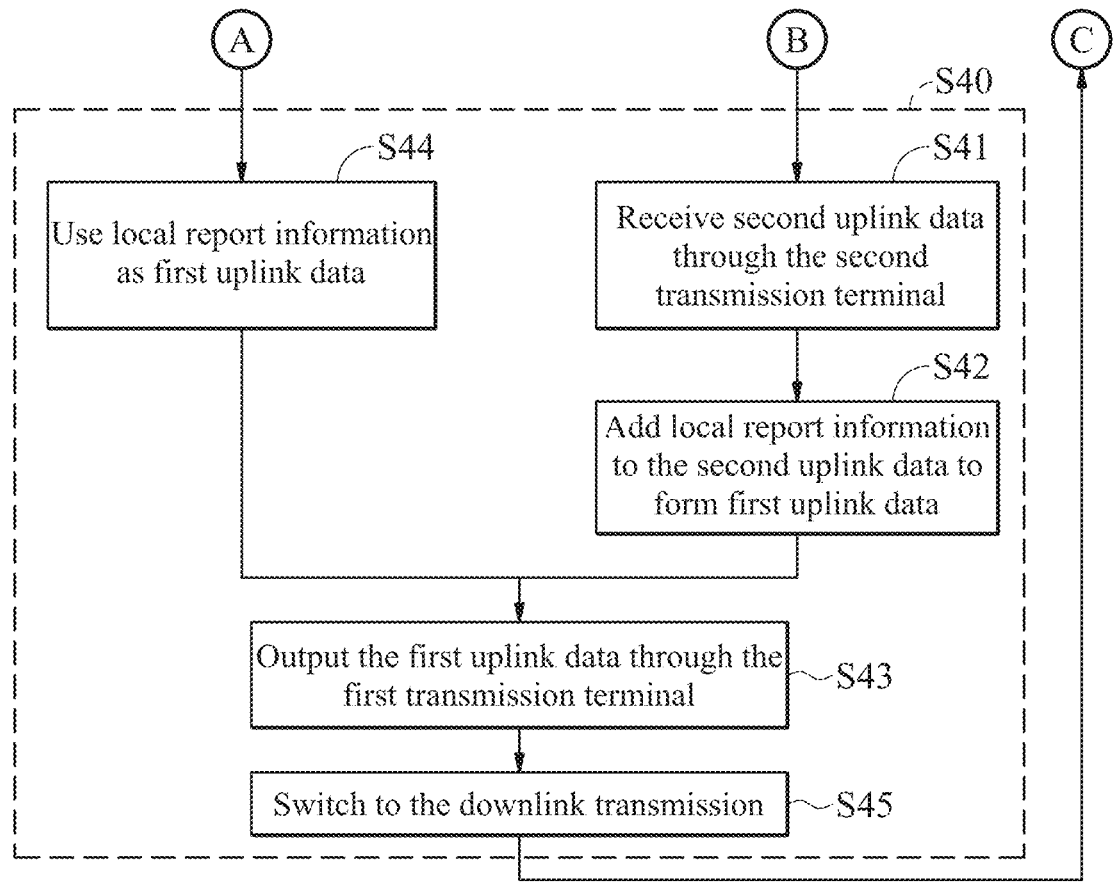

It should be noted that, in the downlink transmission, the control unit 140 performs the removal of the control command corresponding to the local device after determining the number of control commands in the first downlink data D1. In other embodiments, the control unit 140 may first perform the removal of the control command corresponding to the local device and then perform a determination step based on the generated second downlink data D2. Therefore, as shown in FIGS. 8A~8B, in another embodiment of the serial bidirectional communication method, after Step S31, the control unit 140 may first remove the control command corresponding to the local device from the obtained the first downlink data D1 to generate the second downlink data D2 (Step S33C), and then the control unit 140 determines whether there is at least one control command remaining in the second downlink data D2 (Step S36).

When the control unit 140 determines, in Step S36, that there is at least one control command remaining in the second downlink data D2, the control unit 140 continues to perform Step S34 and subsequent steps. When the control unit 140 determines, in Step S36, that there is no control command remaining in the second downlink data D2, the control unit 140 continues to perform Step S35B and subsequent steps.

In the first embodiment of the application system, the serial bidirectional communication circuit 100A connected to the main system device 200 may further output the selection signal S1 to the main system device 200, so that the main system device 200 can learn about whether the downlink transmission or uplink transmission is performed at this time based on the selection signal S1.

In one embodiment, as shown in FIG. 5, the main system device 200 may comprise a main system circuit 210 and a selector 220. The selector 220 is coupled between the main system circuit 210 and the first transmission terminal 110 of the series bidirectional communication circuit 100A. The selector 220 selectively establishes an electrical connection between an output pin 211 of the main system circuit 210 and the first transmission terminal 110 when the logic value of the selection signal S1 is equal to the first value for the downlink transmission. In addition, the selector 220 selec- tively establishes an electrical connection between an input pin 212 of the main system circuit 210 and the first transmission terminal 110 when the logic value of the selection signal S1 is equal to the second value for the uplink transmission.

Figure 9:
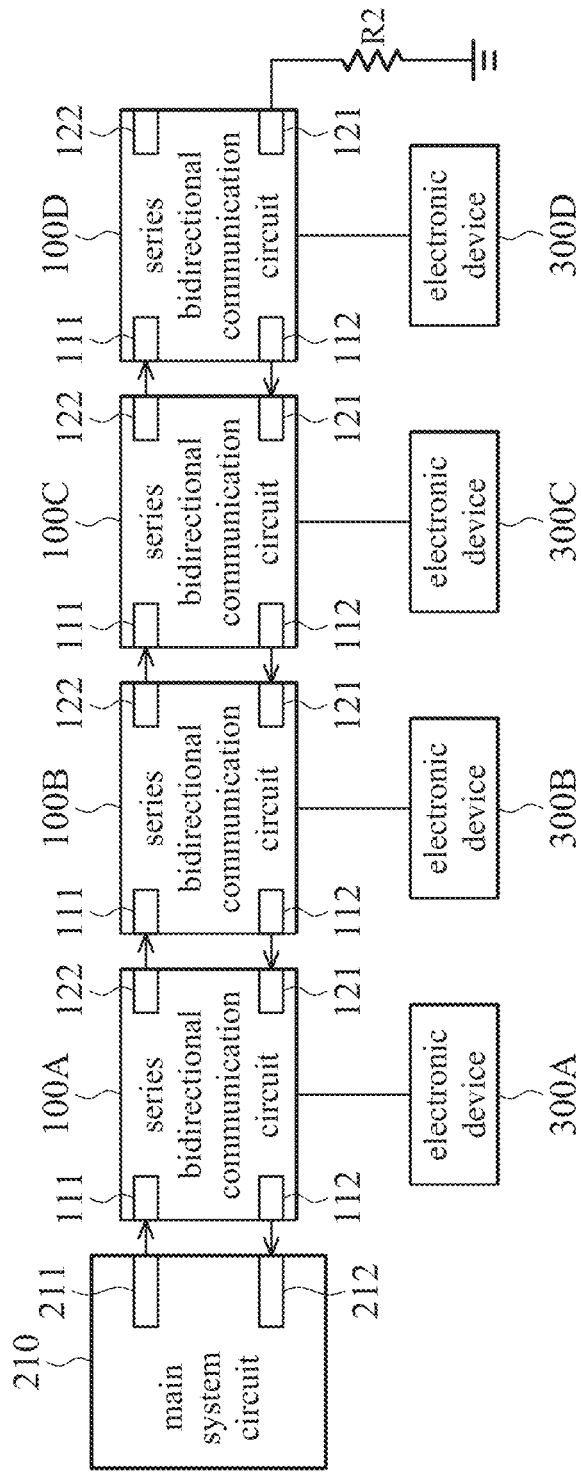
FIG. 9 is a schematic diagram showing a second embodiment of an application system.

FIG. 9 is a schematic diagram showing a second embodiment of an application system. Please refer to FIG. 9, in the second embodiment of the application system, the serial bidirectional communication circuits 100A~100D may be successively connected to the main system device 200 in series through two connection lines, and the main system device 200 and serial bidirectional communication circuits 100A~100D may communicate with the electronic devices 300A~300D through the two connection lines. In this way, the main system device 200 does not consume more pins for bidirectional communication. Thus, the configuration or layout of the connection lines in the application system is simplified.

In the second embodiment of the application system, the uplink transmission and the downlink transmission can be performed at the same time due to the two separate connection lines, so full-duplex communication can be achieved. In the embodiment, the first transmission terminal 110 of each of the serial bidirectional communication circuits 100A~100D comprises a first input pin 111 and a first output pin 112, and the second transmission end 120 thereof comprises a second input pin 121 and a second output pin 122.

In the embodiment, the first input pin 111 and the first output pin 112 of the series bidirectional communication circuit 100A are connected to the output pin 211 and the input pin 212 of the main system device 200 respectively. The first input pin 111 and the first output pin 112 of the series bidirectional communication circuit 100B are connected to the second output pin 122 and the second input pin 121 of the series bidirectional communication circuit 100A respectively. The first input pin 111 and the first output pin 112 of the series bidirectional communication circuit 100C are connected to the second output pin 122 and the second input pin 121 of the series bidirectional communication circuit 100B respectively. In addition, the first input pin 111 and the first output pin 112 of the series bidirectional communication circuit 100D are connected to the second output pin 122 and the second input pin 121 of the series bidirectional communication circuit 100C respectively.

In the embodiment, the first input pin 111 and the second output pin 122 of each of the series bidirectional communication circuits 100A~100D can be used for the downlink transmission. For example, the first downlink data D1 is received through the first input pin 111, and the second downlink data D2 is output through the second output pin 122. In addition, the second input pin 121 and the first output pin 112 of each of the serial bidirectional communication circuits 100A~100D can be used for the uplink transmission. For example, the first uplink data U1 is output through the first output pin 112, and the second uplink data U2 is received through the second input pin 121.

Figure 10:
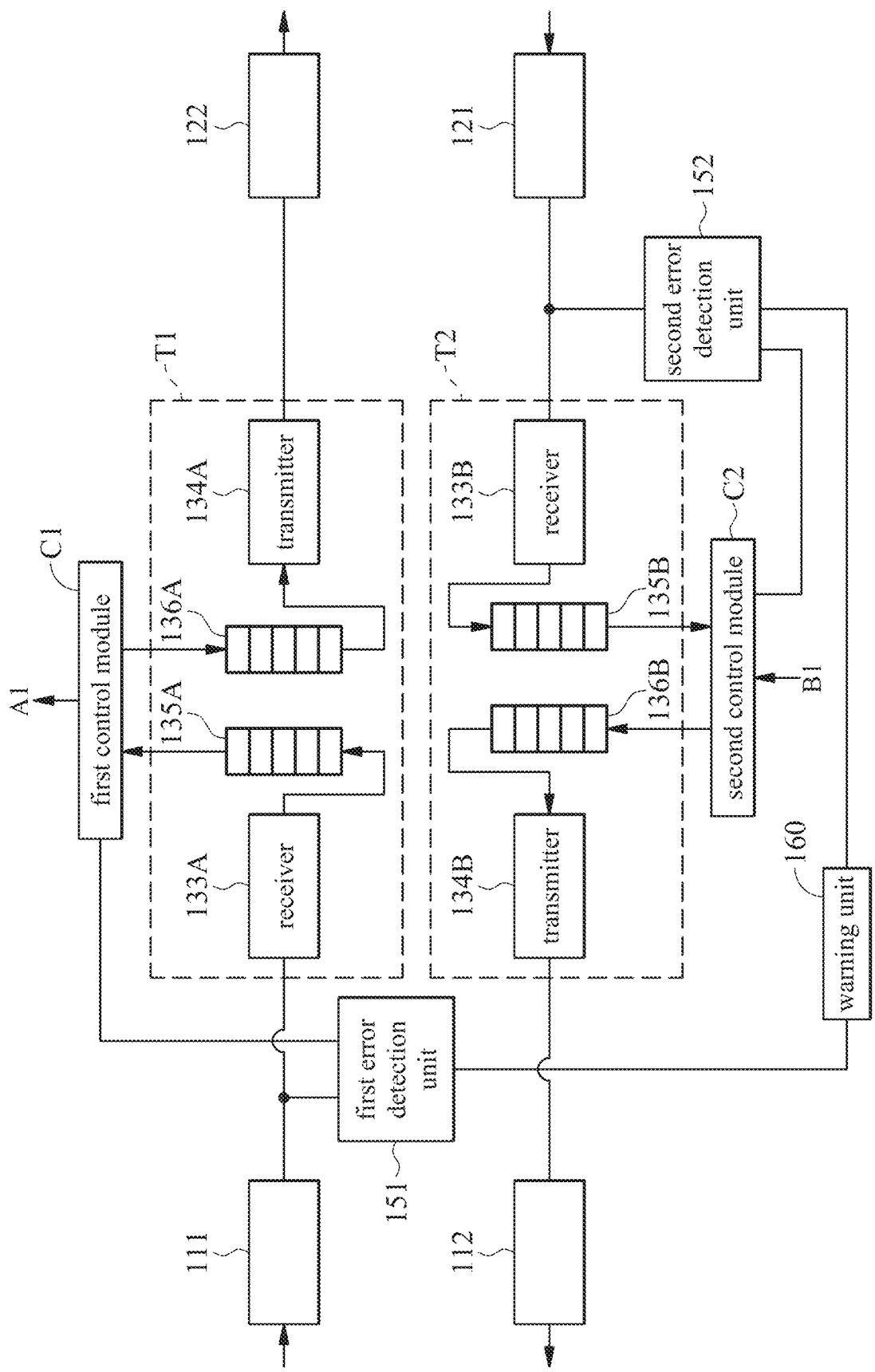
FIG. 10 is a schematic diagram showing an exemplary embodiment of a series bidirectional communication circuit in FIG. 9.

FIG. 10 is a schematic diagram showing an exemplary embodiment of the series bidirectional communication circuit in FIG. 9; Referring to FIGS. 9~10, in the second embodiment of the application system, the transmission unit 130 of each of the series bidirectional communication circuits 100A~100D may comprise a first transmission module T1 and a second transmission module T2. The control unit 140 of each of the serial bidirectional communication circuits 100A~100D may comprise a first control module C1 and a second control module C2. The first transmission module T1 is coupled between the first input pin 111 and the second output pin 122 and controlled by the first control module C1. The second transmission module T2 is coupled between the first output pin 112 and the second input pin 121 and controlled by the second control module C2.

The first transmission module T1 may comprise a receiver 133A, a transmitter 134A, a first queue 135A, and a second queue 136A. The receiver 133A is coupled between the first input pin 111 and an input terminal of the first queue 135A, and an output terminal of the first queue 135A is coupled to the first control module C1. The transmitter 134A is coupled between the second output pin 122 and an output terminal of the second queue 136A, and an input terminal of the second queue 136A is coupled to the first control module C1.

Figure 11A:
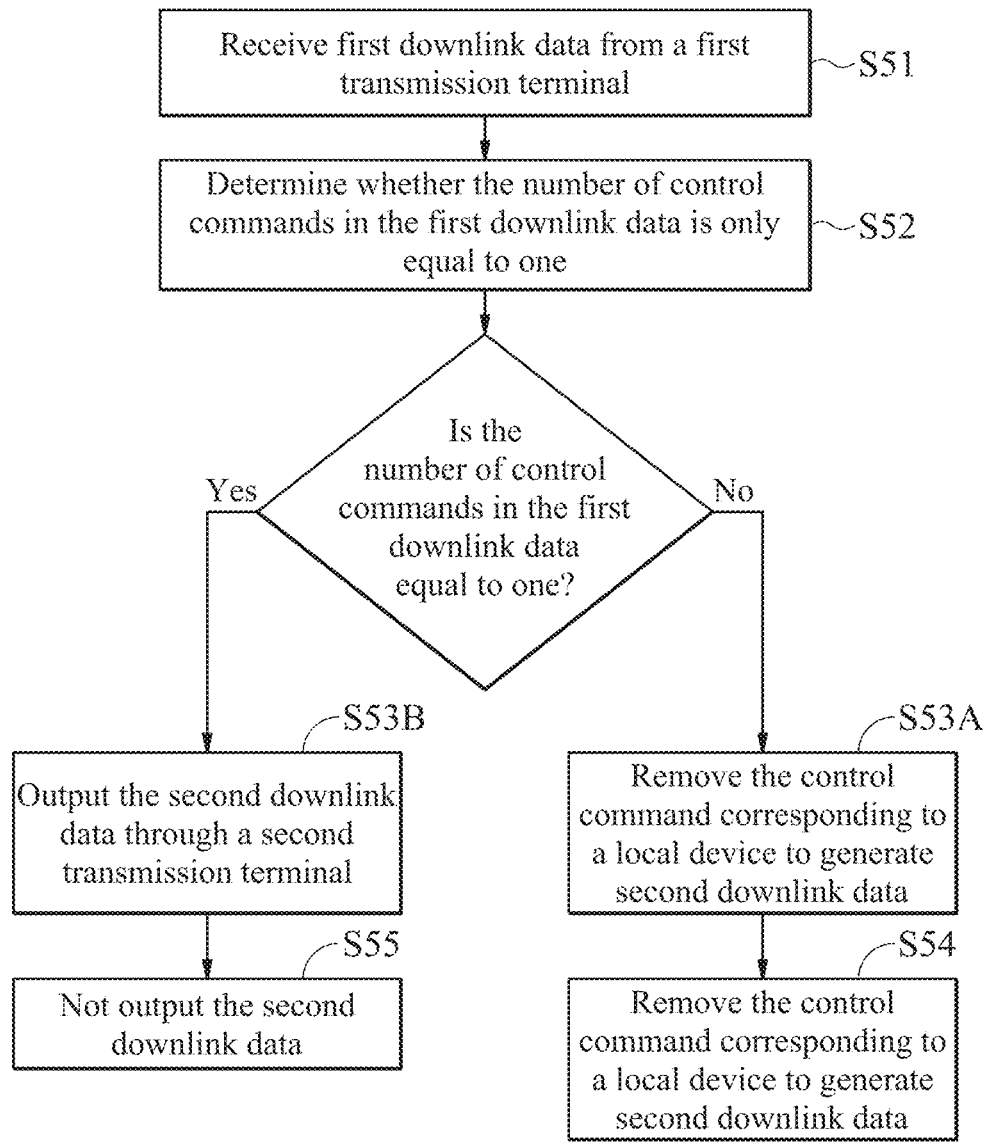
FIG. 11A is a flow charts of a downlink transmission in one exemplary embodiment of a serial bidirectional communication method for a serial bidirectional communication circuit in FIG. 10.
Figure 11B:
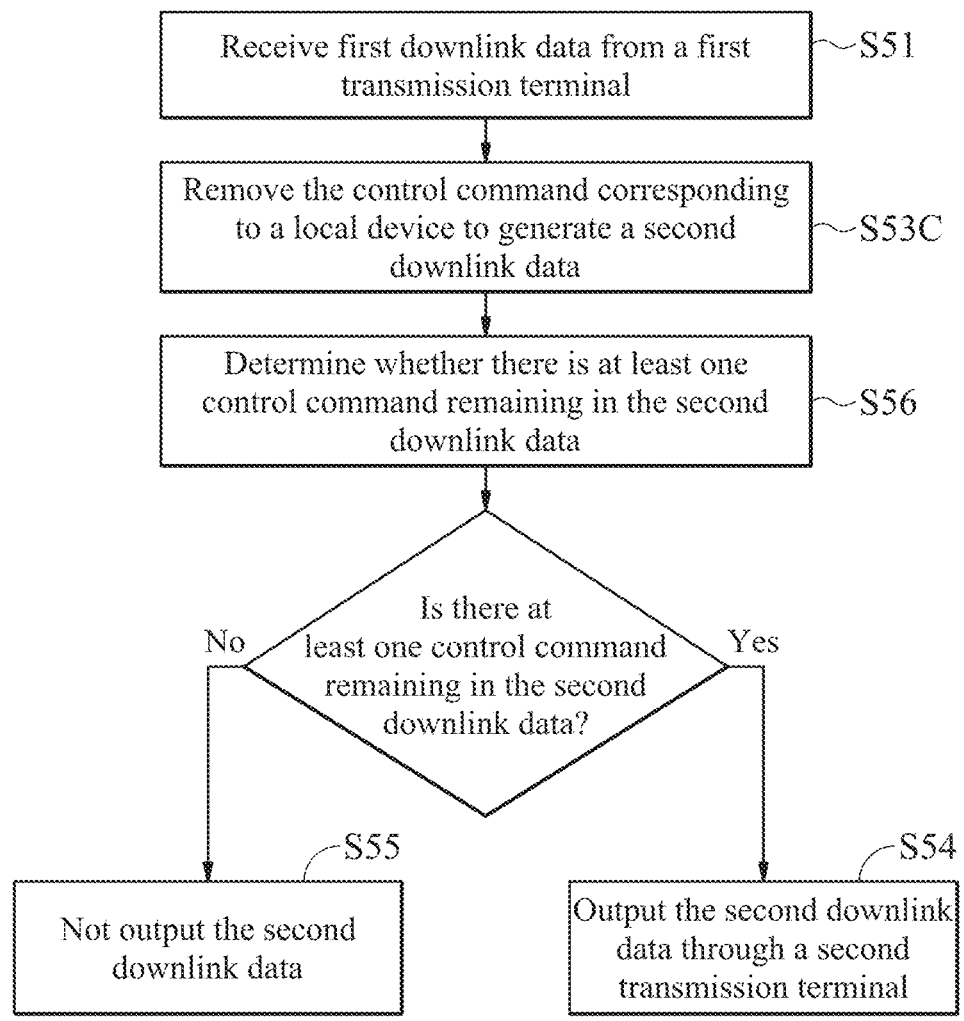
FIG. 11B is a flow chart of a downlink transmission in another exemplary embodiment of a serial bidirectional communication method for a serial bidirectional communication circuit in FIG. 10.

In the embodiment, the first control module C1 and the first transmission module T1 are responsible for the downlink transmission. Therefore, the first control module C1 performs a step of a downlink transmission (Step S50) in an embodiment of the serial bidirectional communication method shown in FIG. 11A or FIG. 11B. Compared with the other previous embodiments, because the first control module C1 performs only the steps of the downlink transmission, the first control module C1 does not need to perform the step of switching to the uplink transmission (i.e., Step S35A or S35B shown in FIG. 7A or Step S35B shown in FIG. 8A). The details of the steps shown in FIG. 11A or FIG. 11B can be referred to the previous description of FIGS. 7A-7B or FIGS. 8A-8B, and, thus, it will not be repeated here.

As shown in FIG. 10, the second transmission module T2 is substantially the same as the first transmission module T1 and may comprise a receiver 133B, a transmitter 134A, a first queue 135B, and a second queue 136B. The receiver 133B is coupled between the second input pin 121 and an input terminal of the first queue 135B, and an output terminal of the first queue 135B is coupled to the second control module C2. The transmitter 134B is coupled between the first output pin 112 and an output terminal of the second queue 136B, and an input terminal of the second queue 136B is coupled to the second control module C2. In the embodiment, the second control module C2 and the first transmission module T2 are responsible for the uplink transmission.

In the second embodiment of the application system, when the data is not output, an output terminal of the transmitter 134B (or the transmitter 134A) is maintained at a high voltage level. When the data is output, the output terminal of the transmitter 134B (or the transmitter 134A) changes between a high voltage level and a low voltage level based on the content of the data. If the transmitter 134B (or the transmitter 134A) or the first output pin 112 (or the second output pin 122) is failed, damaged and shorted to the ground, a second error detection unit 152 (or a first error detection unit 152) in another series bidirectional communication circuit coupled to the first output pin 112 (or the second output pin 122) can detect the continuous low voltage level and learn about the above failure situation according to the detected continuous low voltage level.

In the second embodiment of the application system, when the second input pin 121 of the series bidirectional communication circuit is connected to the first output pin 112 of another series bidirectional communication circuit, the second control module C2 of the series bidirectional communication circuit detects the high voltage level at the second input pin 121 by the second error detection unit 152. In the embodiment, the second input pin 121 of the serial bidirectional communication circuit 100D is not connected to the first output pin 112 of another serial bidirectional communication circuit. In order to prevent the second input pin 121 of the serial bidirectional communication circuit 100D from floating due to the open connection, the second input pin 121 thereof may be further coupled to the ground voltage through a pull-down resistor R2. In this way, the second error detection unit 152 of the series bidirectional communication circuit 100D can detect a continuous low voltage level. Based on the detected continuous low voltage level, the second control module C2 of the series bidirectional communication circuit 100D learns about that the series bidirectional communication circuit 100D is the first one in the uplink transmission and then actively initiates the uplink transmission (that is, the local report information B4 is used as the first uplink data U1).

It should be noted that the present invention does not limit the series bidirectional communication circuit 100D as the first series bidirectional communication circuit in the uplink transmission. For example, in the case where the series bidirectional communication circuit 100C is burned out and shorted to the ground (for example, the transmitter 134B or the first output pin 112 is failed or damaged), the second error detection unit 152 of the series bidirectional communication circuit 100B detects a continuous low voltage level. Based on the detected continuous low voltage level, the second control module C2 of the series bidirectional communication circuit 100B learns about that the series bidirectional communication circuit 100B is the first one in the uplink transmission and then actively initiates the uplink transmission (that is, the local report information B2 is used as the first uplink data U1).

Figure 12:
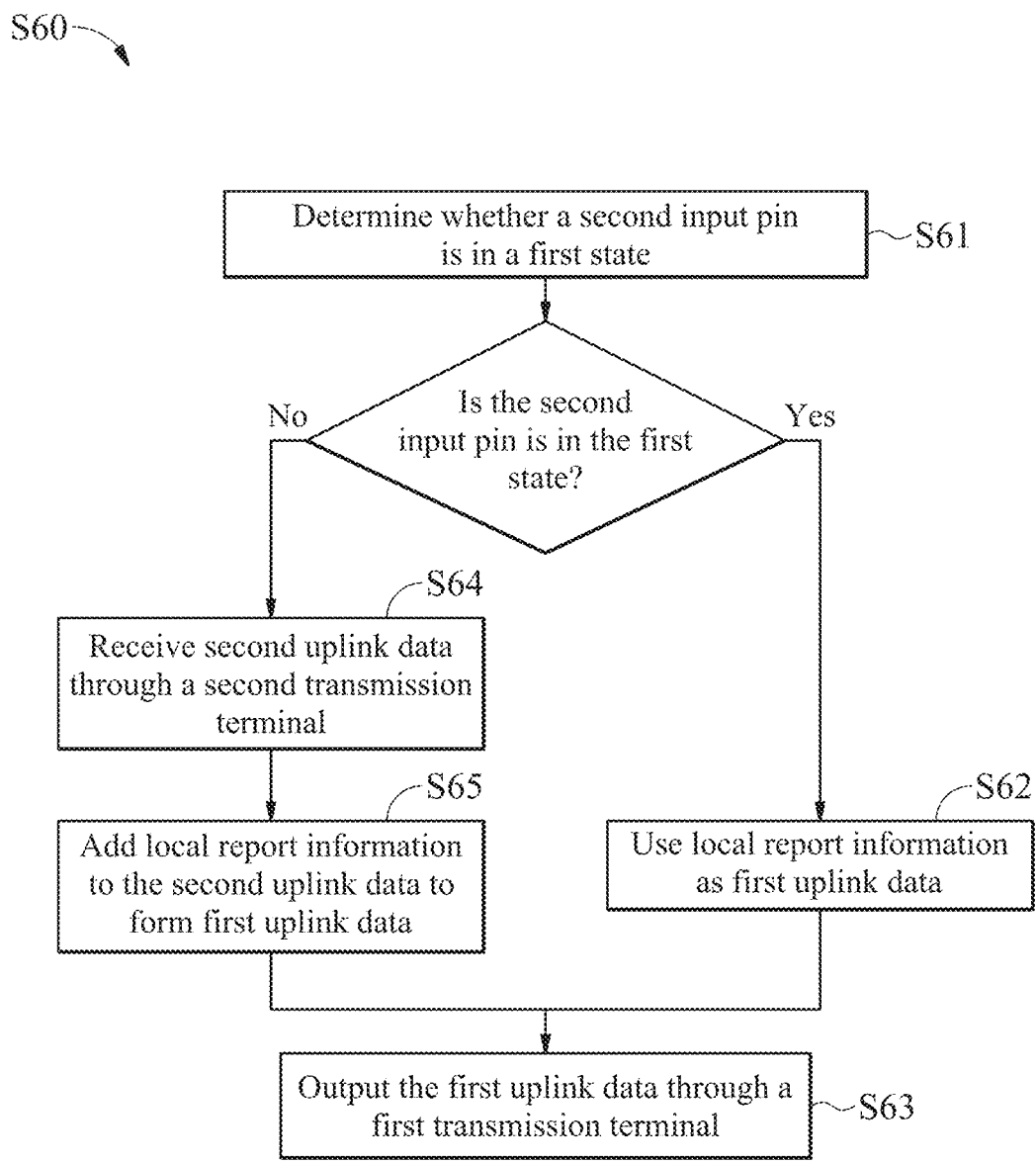
FIG. 12 is a flow chart of an uplink transmission in one exemplary embodiment of a serial bidirectional communication method for a serial bidirectional communication circuit in FIG. 10.

FIG. 12 is a flow chart of an uplink transmission in one exemplary embodiment of a serial bidirectional communication method for the serial bidirectional communication circuit in FIG. 10. Referring to FIGS. 9, 10, and 12, in a step of an uplink transmission (Step S60) of an embodiment of the serial bidirectional communication method, the second control module C2 of the serial bidirectional communication circuit may first determine whether the second input pin is in a first state (Step S61). In the embodiment, the first state is the aforementioned continuous low voltage level.

When the second control module C2 determines that the second input pin 121 is in the first state, the second control module C2 learns about that the serial bidirectional communication circuit which it belongs to is the first one in the uplink transmission. Therefore, the second control module C2 directly uses the local report information as the first uplink data U1 and write it into the second queue 136B (Step S62). In addition, the second control module C2 obtains the first uplink data U1 from the second queue 136B by the transmitter 134B and transmits the obtained first uplink data U1 through the first transmission terminal 110 (Step S63) to actively initiate the uplink transmission. When the second control module C2 determines that the second input pin 121 is not in the first state, the second control module C2 first receive the second uplink data U2, which is transmitted by another serial bidirectional communication, from the second transmission terminal 120 through the receiver 133B (Step S64), and the receiver 133B writes the second uplink data U2 into the first queue 135B.

Then, the second control module C2 obtains the second uplink data U2 by reading the first queue 135B and adds the local report information returned by the local device to the second uplink data U2 to form the first uplink data U1 (Step S65). For example, the local report information is cascaded to the front of at least one cascaded piece of report information. Then, the second control module C2 performs Step S63 to transmit the first uplink data U1 through the first transmission terminal 110.

In some embodiments, each of the series bidirectional communication circuits 100A~100D may further comprise a first error detection unit 151 and a second error detection unit 152. The first error detection unit 151 operates to detect whether the downlink data can be received through the first transmission terminal 110 and determine that a failure situation occurs when the downlink data is not received. The second error detection unit 152 operates to detect whether the uplink data can be received through the second transmission terminal 120 and determine that a failure situation occurs when the uplink data is not received.

In the first embodiment of the application system, as shown in FIG. 6, the first error detection unit 151 of each of the series bidirectional communication circuits 100A~100D is coupled to the first transmission terminal 110, and the second error detection unit 152 thereof is coupled to the second transmission terminal 120. In the second embodiment of the application system, as shown in FIG. 10, the first error detection unit 151 of each of the series bidirectional communication circuits 100A~100D is coupled to the first input pin 111, and the second error detection unit 152 is coupled to the second input pin 121. In addition, in the second embodiment of the application system, the second control module C2 determines whether a failure situation occurs at the second input pin 121 according to the detection result of the second error detection unit 152.

In some embodiments, each of the serial bidirectional communication circuits 100A~100D may further comprise a warning unit 160. The warning unit 160 operates to output a warning to the main system device 200 when the first error detection unit 151 and/or the second error detection unit 152 determines that a failure situation occurs. In addition, the warning unit 160 of each of the serial bidirectional communication circuits 100A~100D may be further coupled to the corresponding one of the electronic devices 300A~300D to receive one error message of the corresponding one of the electronic devices 300A~300D (for example, the error message indicates that it is failed to output report information). The warning unit 160 generates a warning to the main system device 200 when receiving the error message. In the embodiment, the main system device 200 learns about which serial bidirectional communication circuit a failure situation occurs in according to the source of the received warning.

In some embodiments, the warning unit 160 of each of the series bidirectional communication circuits 100A~100D is connected to the main system device 200 through a physical connection line to transmit the warning to the main system device 200, however, the present invention is not limited thereto. In other embodiments, the warning unit 160 may transmit the warning to the main system device 200 in a wireless transmission manner. The wireless transmission method may be, but not limited to, Bluetooth, WiFi, a wireless network, etc.

In some embodiments, each of the series bidirectional communication circuits 100A~100D may be made into a chip through various integrated circuit manufacturing processes. Each unit in each of the series bidirectional communication circuits 100A~100D, such as a transmission unit, a control unit, etc., may use logic circuits to realize its functions. In addition, the connection lines between the respective serial bidirectional communication circuits 100A~100D and the main system device 200 and between the respective serial bidirectional communication circuits 100A~100D and the respective electronic devices 300A~300D may be implemented by wires on the circuit board. However, the present invention is not limited to the above. In other embodiments, the connection lines between the respective serial bidirectional communication circuits 100A~100D and the main system device 200 and between the respective serial bidirectional communication circuits 100A~100D and the respective electronic devices 300A~300D may be implemented by physical connection cables, etc., in other words, the electronic devices 300A~300D are fat away from the main system device 200.

In some embodiments, the electronic devices 300A~300D may be, for example, fan devices. Accordingly, each control command in the downlink data may be a pulse width modulation (PWM) signal used to control the speed of the fan device. Moreover, each record of the report information in the uplink data may be a kind of rotation speed information. In addition, each of the series bidirectional communication circuits 100A~100D may be integrated with other circuits for driving and detecting the fan devices, such as a fan-type detection circuit, a voltage regulation circuit, a tachometer, etc., however, the present invention is not limited thereto. In other embodiments, each of the electronic devices 300A~300D may be, for example, a digital meter, each control command in the downlink data may be a control signal used to enable the digital meter to calculate a value, and each record of the report information in the uplink data may be a value calculated by a digital meter.

In summary, the embodiments of the present invention provide a serial bidirectional communication circuit and a method thereof. Downlink data which comprises at least one cascaded control command is received. After the control command corresponding to the local device is removed from the downlink data, the downlink data which still comprises at least one remaining control command is output for a downlink transmission in the serial downlink transmission. Uplink data is generated according to the local report information of the local device and then output for an uplink transmission in the serial bidirectional communication. In addition, the serial bidirectional communication circuit and a method thereof according to the embodiments of the present invention performs a serial bidirectional communication through a single connection line or two connection lines, which may greatly reduce the number of pins of the main system device used for the bidirectional communication and further simplify the configuration or layout of the connection lines in the entire application system.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, the system and method described in the embodiments of the present invention may be implemented by physical embodiments of hardware, software, or a combination of hardware and software. Therefore, the scope of the appended claims should be accorded the broadest interpretation so as to encompass all such modifications and similar arrangements.

What is claimed is:

1. A serial bidirectional communication method comprising:
   performing a downlink transmission, wherein the downlink transmission comprises:
   receiving first downlink data through a first transmission terminal, wherein the first downlink data comprises at least one control command, and the at least one control command is configured to control at least one electronic device;

removing one, corresponding to a local device, of the at least one control command from the first downlink data to form second downlink data, wherein the local device is one of the at least one electronic device; and when there is a control command remaining in the second downlink data, outputting the second downlink data through a second transmission terminal; and performing an uplink transmission, where the uplink transmission comprises:

outputting first uplink data through the first transmission terminal, wherein the first uplink data comprises local information generated by the local device.

2. The serial bidirectional communication method as claimed in claim 1, further comprising:

switching to performing the uplink transmission when there is no control command remaining in the second downlink data, or when the second downlink data has been output through the second transmission terminal.

3. The serial bidirectional communication method as claimed in claim 2, wherein the uplink transmission further comprises:

receiving second uplink data through the second transmission terminal; and adding the local information into the second uplink data to form the first uplink data, wherein the second uplink data comprises at least one cascaded piece of information, each of the at least one cascaded piece of information is generated by one of the at least one electronic device that is not the local device.

4. The serial bidirectional communication method as claimed in claim 1, wherein:

the first transmission terminal comprises a first input pin and a first output pin, and the second transmission terminal comprises a second input pin and a second output pin, receiving the first downlink data through the first transmission terminal comprises receiving the first downlink data through the first input pin, outputting the second downlink data through the second transmission terminal comprises outputting the second downlink data through the second output pin, and outputting the first uplink data through the first transmission terminal comprises outputting the first uplink data through the first output pin.

5. The serial bidirectional communication method as claimed in claim 4, wherein the uplink transmission further comprises:

determining whether the second input pin is in a first state;

in response to determining that the second input pin is not in the first state, receiving second uplink data through the second input pin and adding the local information into the second uplink data to form the first uplink data, wherein the second uplink data comprises at least one cascaded piece of information, and each of the at least one cascaded piece of information is generated by one of the at least one electronic device that is not the local device; and in response to determining that the second input pin is in the first state, using the local information as the first uplink data.

6. A serial bidirectional communication circuit comprising:

a first transmission terminal;

a second transmission terminal;

a transmission unit coupled between the first transmission terminal and the second transmission terminal; and a control unit configured to perform a downlink transmission and an uplink transmission;

wherein, in the downlink transmission, the control unit receives first downlink data which comprises at least one control command through the first transmission terminal, removes one, corresponding to a local device, of the at least one control command by the transmission unit to form second downlink data, and outputs the second downlink data by the transmission unit through the second transmission terminal when there is a control command remaining in the second downlink data, wherein the at least one control command is configured to control at least one electronic device, and the local device is one of the at least one electronic device, and wherein, in the uplink transmission, the control unit outputs first uplink data through the first transmission terminal, wherein the first uplink data comprises local information generated by the local device.

7. The serial bidirectional communication circuit as claimed in claim 6, wherein:

in the downlink transmission, when there is no control command remaining in the second downlink data or when the second downlink data has been output through the second transmission terminal, the control unit switches to the uplink transmission, and in the uplink transmission, when the first uplink data has been output through the first transmission terminal, the control unit switches to the downlink transmission.

8. The serial bidirectional communication circuit as claimed in claim 7, wherein:

in the uplink transmission, the control unit further receives second uplink data through the second transmission terminal and adds the local information into the second uplink data to form the first uplink data, and the second uplink data comprises at least one cascaded piece of information, and each of the at least one cascaded piece of information is generated by one of the at least one electronic device that is not the local device.

9. The serial bidirectional communication circuit as claimed in claim 8, wherein:

the control unit cascades the local information to the front of the at least one cascaded piece of information to form the first uplink data, and after the control unit switches to the uplink transmission when there is no remaining second downlink data, in the uplink transmission, the control unit uses the local information as the first uplink data.

10. The serial bidirectional communication circuit as claimed in claim 6, wherein:

the first transmission terminal comprises a first input pin and a first output pin, and the second transmission terminal comprises a second input pin and a second output pin, the transmission unit comprises a first transmission module and a second transmission module, the first transmission module is coupled between the first input pin and the second output pin, and the second transmission module is coupled between the second input pin and the first output pin, the control unit comprises a first control module and a second control module, in the downlink transmission, the first control module receives the first downlink by the first transmission module through the first input pin, removes the control command corresponding to the local device among the at least one electronic device by the first transmission module to form the second downlink data, and outputs the second downlink data by the first transmission module through the second output pin in response to the second downlink data comprising the control command, and in the uplink transmission, the second control module outputs the first uplink data by the second transmission module through the first output pin.

11. The serial bidirectional communication circuit as claimed in claim 10, wherein:

in the uplink transmission, the second control module further determines whether the second input pin is in a first state, in response to determining that the second input pin is not in the first state, the second control module further receives second uplink data by the second transmission module through the second input pin and adds the local information into the second uplink data by the second transmission module to form the first uplink data, the second uplink data comprises at least one cascaded piece of information, and each of the at least one cascaded piece of information is generated by one of the at least one electronic device that is not one of the local devices, and in response to determining that the second input pin is in the first state, the second control module uses the local information as the first uplink data.

12. The serial bidirectional communication circuit as claimed in claim 6, wherein the transmission unit comprises:

a first selector comprising a first connection terminal, a second connection terminal, and a third connection terminal, wherein the first connection terminal is coupled to the first transmission terminal, and the second connection terminal is coupled to the second transmission terminal, and wherein in the downlink transmission, the first selector establishes a first connection path between the first connection terminal and the third connection terminal, and in the uplink transmission, the first selector establishes a second connection path between the second connection terminal and the third connection terminal;

a receiver coupled to the third connection terminal of the first selector;

a first queue coupled between the receiver and the control unit;

a second selector comprising a fourth connection terminal, a fifth connection terminal, and a sixth connection terminal, wherein the fourth connection terminal is coupled to the second transmission terminal, and the fifth connection terminal is coupled to the first transmission terminal, and wherein in the downlink transmission, the second selector establishes a third connection path between the fourth connection terminal and the sixth connection terminal, and in the uplink transmission, the second selector establishes a fourth connection between the fifth connection terminal and the sixth connection terminal;

a transmitter coupled to the sixth connection terminal of the second selector; and a second queue is coupled between the transmitter and the control unit.

13. The serial bidirectional communication circuit as claimed in claim 12, wherein in this downlink transmission:

the control unit causes the first selector to establish the first connection path and causes the second selector to establish the third connection path, the receiver receives the first downlink data through the first connection path and writes the first downlink data into the first queue, the control unit obtains the first downlink data from the first queue and removes the control command corresponding to the local device to form the second downlink data, the control unit writes the second downlink data into the second queue when there is a control command remaining in the second downlink data, and the transmitter obtains the second downlink data from the second queue and outputs the second downlink data through the third link path.

\* \* \* \* \*